United States Patent
Stehle et al.

(10) Patent No.: US 8,100,234 B2
(45) Date of Patent: Jan. 24, 2012

(54) MANUALLY GUIDED IMPLEMENT AND METHOD OF PRODUCING A BRAKE MECHANISM OF A MANUALLY GUIDED IMPLEMENT

(75) Inventors: Hans Peter Stehle, Winnenden (DE); Viktoria Schmidt, Bietigheim-Bissingen (DE)

(73) Assignee: Andreas Stihl AG & Co. KG (DE)

( * ) Notice: Subject to any disclaimer, the term of this patent is extended or adjusted under 35 U.S.C. 154(b) by 832 days.

(21) Appl. No.: 12/119,312

(22) Filed: May 12, 2008

(65) Prior Publication Data

US 2008/0289924 A1      Nov. 27, 2008

(30) Foreign Application Priority Data

May 24, 2007   (DE) .................. 10 2007 024 170

(51) Int. Cl.
*F16D 49/08*      (2006.01)
*F16D 69/02*      (2006.01)
(52) U.S. Cl. .............. 188/77 W; 188/251 A; 188/251 M
(58) Field of Classification Search ............... 188/77 W, 188/77 R, 251 A, 251 M
See application file for complete search history.

(56) References Cited

U.S. PATENT DOCUMENTS

| | | | |
|---|---|---|---|
| 3,014,884 A * | 12/1961 | Bray | 188/251 M |
| 3,670,392 A * | 6/1972 | Haas | 29/411 |
| 3,909,252 A * | 9/1975 | Kuriyama et al. | 188/218 XL |
| 4,635,364 A * | 1/1987 | Noll et al. | 188/77 R |
| 4,808,275 A * | 2/1989 | Ohzora et al. | 188/251 M |
| 4,949,818 A | 8/1990 | Siede | |
| 7,879,129 B2 * | 2/2011 | Kosters et al. | 75/242 |
| 2008/0308365 A1 * | 12/2008 | Foge et al. | 188/251 A |

FOREIGN PATENT DOCUMENTS

JP           01182639 A   *   7/1989

* cited by examiner

*Primary Examiner* — Thomas J Williams
(74) *Attorney, Agent, or Firm* — Robert W. Becker; Robert Becker & Assoc.

(57) ABSTRACT

A manually guided implement having a tool and a brake mechanism for the tool. The brake mechanism includes a brake band that is looped about a brake drum. The brake band and the brake drum form abrasion partners that cooperate with one another during a braking process. At least one of the abrasion partners has a coating. The coating is provided with diamond particles that are embedded in a matrix that contains nickel. The coating is effected in a nickel bath in which the diamond particles are dispersed.

12 Claims, 1 Drawing Sheet

MANUALLY GUIDED IMPLEMENT AND METHOD OF PRODUCING A BRAKE MECHANISM OF A MANUALLY GUIDED IMPLEMENT

The instant application should be granted the priority date of May 24, 2007 the filing date of the corresponding German patent application DE 10 2007 024 170.6.

BACKGROUND OF THE INVENTION

The present invention relates to a manually guided implement having a tool and a brake mechanism for the tool, whereby the brake mechanism includes a brake band that is looped about a brake drum. The present invention also relates to a method of producing a brake mechanism of a manually guided implement.

U.S. Pat. No. 4,949,818 discloses a brake band for the brake drum of a power saw, with the brake band being coated with a thermally applied friction layer.

In particular with implements that have a safety brake and in addition a deceleration brake, the brake band is very highly stressed. This shortens the service life of the brake band.

The brake band, the brake drum and the brake spring have a determinative effect upon the braking action. The brake spring exerts high forces upon the housing of the implement. In particular with implements having plastic housings, it is desirable to have as weak a brake spring as possible in order to reduce the forces that are exerted upon the plastic housing. In order to achieve good braking results even with weak brake springs, it is desirable to have a brake band or brake drum that has a very good braking effect.

It is an object of the present invention to provide a manually guided implement of the aforementioned general type, the brake mechanism of which has a long service life and delivers good braking results. It is a further object of the present invention to provide a method for producing a brake mechanism of a manually guided implement.

BRIEF DESCRIPTION OF THE DRAWING

These and other objects and advantages of the present invention will appear more clearly from the following specification in conjunction with the accompanying schematic drawing, in which.

SUMMARY OF THE INVENTION

Figure 1:
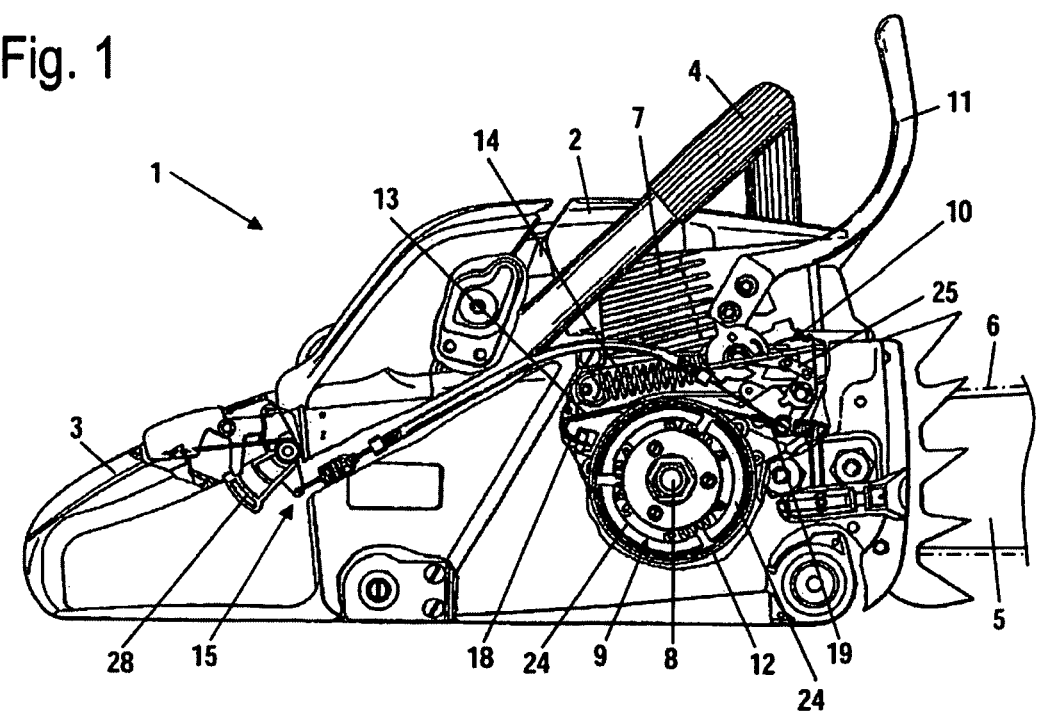
FIG. 1 shows a side view of a power saw.

With regard to the manually guided implement, the objects of the present invention are realized by an implement that comprises a tool; a brake mechanism for the tool, wherein the brake mechanism includes a brake band that is looped about a brake drum, and wherein the brake band and the brake drum form abrasion partners that cooperate with one another during a braking process; and a coating that is provided on at least one of the abrasion partners, wherein the coating includes diamond particles that are embedded in a matrix, and wherein the matrix contains nickel.

It has been shown that good braking results can be achieved if at least one of the abrasion partners is provided with a coating that includes diamond particles. In this connection, the diamond particles are embedded in a matrix that contains nickel. The diamond particles that are embedded in the nickel matrix provide good braking results. As a result, the brake spring can be made relatively weak. At the same time, it has been shown that the wear is low. It has also been shown that diamond particles that are contained in a coating of the one abrasion partner become partially embedded in the other abrasion partner during operation after a plurality of braking processes. Although the braking effect is essentially achieved by abrasion, none the less, the diamond particles that become separated from the coating due to the abrasion are not lost; rather, they become embedded in the other abrasion partner.

Good braking results, with low wear, can be achieved if the coating contains approximately 30% to approximately 50% diamond particles. A content of about 40% diamond particles in the coating has been shown to be advantageous. The percentage portions given are percents by volume.

Good braking results are achieved if the surface of the coating is relatively fine. The diamond particles advantageously have an average granular size of up to about 15 µm, in particular from approximately 5 µm to approximately 10 µm. A good braking effect is achieved with these low average granular sizes. At the same time, the wear of the other abrasion partner is very low. The matrix advantageously contains approximately 3% to approximately 10% phosphorous. The phosphorous content enables a tempering of the nickel matrix. This reduces the wear. At the same time, the tempering increases the binding of the diamond particles in the matrix. The matrix is advantageously comprised entirely of nickel and phosphorous, so that no other substituents are contained in the matrix. The thickness of the coating is advantageously selected to be relatively low. This results in a good adhesion of the coating to the base material. At the same time, the required quantity of diamond particles, which represents a valuable raw material, can be kept low. Due to the low wear, a small thickness of the coating is sufficient for an adequately long service life of the brake mechanism. The thickness of the coating is advantageously approximately 10 µm to approximately 80 µm. The thickness of the coating is in particular approximately 25 µm to approximately 50 µm.

A low arithmetic average roughness value, and a low roughness depth, have been shown to be advantageous. The low roughness of the surface ensures a low wear during operation. An arithmetic average roughness value of the coating of approximately 3 µm to approximately 10 µm has been shown to be advantageous. The coating advantageously has an averaged roughness depth of approximately 0.4 µm to approximately 1 µm. It is provided that at a depth of cut of 3 µm, and below a 5%-line, the coating have a material proportion of approximately 35% to approximately 60%. In this connection, the 5%-line is an imaginary reference line at a level that is 5% of the measured roughness profile height below the maximum profile height. To obtain the 5%-line, conceptually 5% of the measured roughness profile height is cut off, and the resulting conceived cutting line is used as the reference line. At a depth of cut of 10 µm, and below the 5%-line, the material proportion of the coating is advantageously from approximately 60% to approximately 90%.

Expediently, only the brake band has a coating with diamond particles. The brake band can easily be provided with the coating. Due to the fact that only one of the abrasion partners, namely the brake band, is provided with the coating, the manufacture of the other abrasion partner, namely the brake drum, is simplified.

For a method of producing a brake mechanism of a manually guided implement that includes a brake drum and a brake band, whereby the brake band is looped about the brake drum, whereby the brake band and the brake drum form abrasion partners that cooperate with one another during the braking process, and whereby at least one of the abrasion partners is coated, it is provided that the coating be effected in a nickel bath in which the diamond particles are dispersed.

The coating in a nickel bath leads to a low thermal stressing of the abrasion partner. The structure alterations that were produced with preceding process steps can be maintained. With a coating in a nickel bath, low layer thicknesses can be realized that are, for example, considerably below the layer thicknesses that can be produced in a flame spraying process.

The nickel bath advantageously contains phosphorous. As a result, it is possible to have a later tempering of the matrix, which is formed of the nickel and the phosphorous. The coating is in particular applied chemically.

Expediently, only the brake band is coated. The brake band is advantageously rolled or calendered prior to the coating. Due to the fact that the coating is chemically effected in a nickel bath, it is possible to maintain the increased strength of the brake band that is achieved by the rolling or calendering process. A structure alteration is avoided by the coating process.

Further specific features and advantages of the present application will be described in detail subsequently.

DESCRIPTION OF SPECIFIC EMBODIMENTS

Referring now to the drawing in detail, the power saw 1 shown in FIG. 1 has a housing 2, in which are secured a rear handle 3 and a tubular handle 4 for guiding the power saw 1. The power saw has a guide bar 5 that extends toward the front from the front side, which is remote from the rear handle 3. A saw chain 6 circulates on the guide bar 5. The saw chain 6 is driven in a circulating manner by an internal combustion engine 7 that is disposed in the housing 2. An electric motor can also be provided instead of the internal combustion engine 7. The internal combustion engine is advantageously a two-cycle engine or a mixture-lubricated, four-cycle engine. The internal combustion engine 7 has a crankshaft 8, which is connected via a centrifugal clutch 9 with a pinion, which is not shown in FIG. 1, and which drives the saw chain 6.

The centrifugal clutch 9 has a brake drum 12, against which the centrifugal weights 24 of the centrifugal clutch 9 are pressed during operation due to the centrifugal force. The brake drum 12 is part of a brake mechanism 10 of the power saw 1. In addition to the brake drum 12, the brake mechanism 10 includes a brake band 13 that is looped about the outer periphery of the brake drum 12. In the non-actuated state, the brake band 13 has a slight radial spacing relative to the periphery of the brake drum 12. Upon actuation of the brake mechanism 10, the loop that forms the brake band 13 is tightened or drawn together, and the brake band 13 is pressed against the periphery of the brake drum 12, so that the brake drum comes to a stand still.

Figure 2:
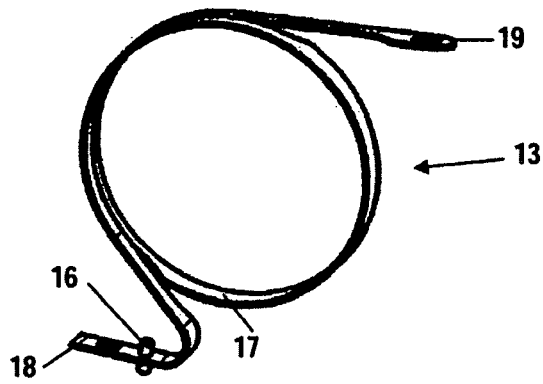
FIG. 2 is a perspective illustration of the brake band of the power saw of FIG. 1.
Figure 3:
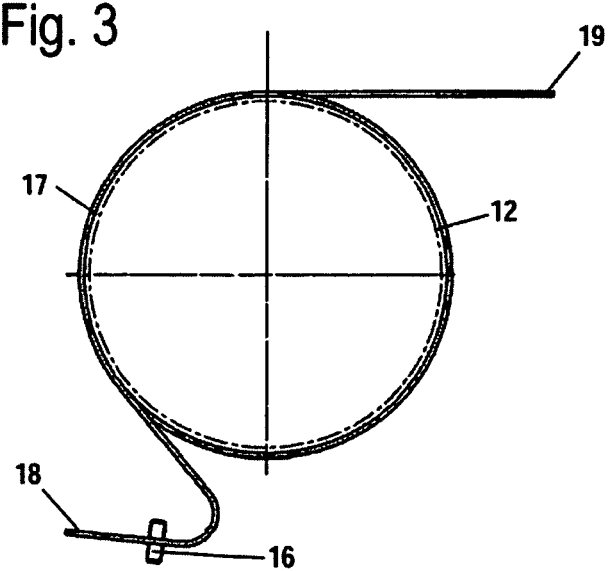
FIG. 3 is a side view of the brake band of FIG. 2.

For the actuation of the brake mechanism 10, mounted on the housing 2 is a hand guard 11 that extends on that side of the tubular handle 4 that faces the guide bar 5. The hand guard 11 actuates the brake mechanism 10 via a bent-lever mechanism 25. The bent-lever mechanism is held in its two end positions, namely the non-actuated and the actuated positions of the brake mechanism 10, by a spring 14. The bent-lever mechanism 25 engages an actuation end 19 of the brake band 13, which is also shown in FIGS. 2 and 3, and draws the brake band tightly about the brake drum 12. The other end of the brake band 13, namely the securement end 18, is secured to the housing 2 of the power saw 1. As shown in FIG. 2, a pin or bolt 16 is provided on the brake band 13 at the securement end 18; the brake band 13 can be fixed in the housing 2 by means of this pin 16.

The power saw 1 shown in FIG. 1 furthermore has an auxiliary braking device 15 for the actuation of the brake mechanism 10. The auxiliary braking device 15 serves as a deceleration brake for the saw chain 6, and is actuated when a throttle trigger 28, which is mounted on the rear handle 3, is released.

Figure 4:
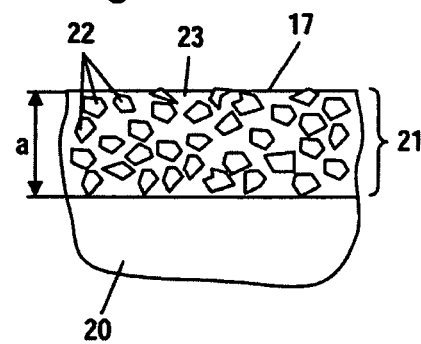
FIG. 4 illustrates the coating of the brake band.

As shown in FIG. 3, on its inner side, which faces the brake drum 12, the brake band 13 has an engagement surface 17, which is provided with a coating or layer 21, as schematically shown in FIG. 4. The coating 21 advantageously extends over a large portion of, and in particular over the entire, engagement surface 17.

As shown in FIG. 4, the brake band 13 has a main body 20, to which the coating 21 is applied. The coating 21 includes diamond particles 22, which are embedded in a matrix 23. The coating 21 has a thickness a, which is advantageously approximately 10 µm to approximately 80 µm. The thickness a of the coating 21 is in particular approximately 25 µm to approximately 50 µm. The matrix 23 is composed of phosphorous and nickel, whereby approximately 3% to approximately 10% phosphorous is contained in the matrix 23. No other substituents other than nickel and phosphorous are provided. The diamond particles 22 are embedded in the nickel and phosphorous matrix 23. The coating 21 advantageously contains approximately 30% to approximately 50% by volume of diamond particles 22. The diamond particle content is advantageously approximately 40% by volume. The diamond particles 22 have an average granular size of up to about 15 µm. The average granular size is advantageously from approximately 5 µm to approximately 10 µm.

A relatively slight roughness is provided for the coating 21. The coating has an arithmetical average roughness $R_a$ of approximately 3 µm to approximately 10 µm. The arithmetical average roughness $R_a$ is the arithmetical average value of the absolute values of the profile deviations within a reference section or stretch of the surface profile of the coating 21. The coating 21 is provided with an averaged roughness depth $R_z$ of approximately 0.4 µm to approximately 1 µm. The averaged roughness depth $R_z$ is the average value of the roughness characteristic magnitude of five reference stretches within an evaluation length.

At a depth of cut of 3 µm, and below a 5%-line, the coating 21 has a material proportion PMr (−3/5) of approximately 35% to approximately 60%. The material proportion PMr of the profile results from the sum of the material lengths of the profiled elements in the prescribed depth of cut divided by the length of the measurement stretch. At a depth of cut of 10 µm, and below a 5%-line, the coating has a material proportion PMr (−10/5) of approximately 60% to approximately 90%.

Thus, for the coating 21 of the brake band 13 a coating is provided that offers a relatively smooth surface. The coating is very thin. With this relatively smooth surface of the brake band 13, a low wear results during operation. The braking effect between brake band 13 and brake drum 12 is essentially produced by abrasion. However, it has been shown that diamond particles 22 from the brake band 13 become embedded in the brake drum 12 after a number of braking procedures, so that after a certain operating period, both friction or abrasion partners contain diamond particles 22. With known brake bands, the braking effect is essentially produced by adhesion. The adhesion can abate, for example due to oxidation of the braking surface, so that with known braking mechanisms the braking effect abates with time. With the inventive coating 21 of a brake band 13, which contains diamond particles 22, very long service lives of the brake mechanism 10 can be achieved with little or no adverse effect upon the braking action.

Figure 5:
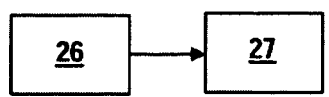
FIG. 5 illustrates the process sequence for producing a brake mechanism.

FIG. 5 schematically shows a process for the production of the brake mechanism 10. The brake band 13 is rolled or calendered in the process step 26. This increases the strength of the brake band 13. Subsequently, the brake band 13 is coated in the process step 27. The coating is effected in a nickel bath in which diamond particles are dispersed, in other words are uniformly distributed. The nickel bath contains phosphorous. The quantities of nickel and phosphorous are coordinated with one another in such a way that a phosphorous content of approximately 3% to approximately 10% is established in the coating on the brake band 13. The coating in the nickel bath is effected chemically, and not galvanically. The desired low thickness a of the coating 21 can be achieved with the coating in the nickel bath. After the coating process, the brake band 13 is installed in the housing 2 of the power saw 1.

The specification incorporates by reference the disclosure of German priority document DE 10 2007 024 170.6 filed May 24, 2007.

The present invention is, of course, in no way restricted to the specific disclosure of the specification and drawing, but also encompasses any modifications within the scope of the appended claims.

We claim:

1. A manually guided implement, comprising:
a tool;
a brake mechanism for the tool, wherein said brake mechanism includes a brake band that is looped about a brake drum, and wherein said brake band and said brake drum form abrasion partners that cooperate with one another during a braking process; and
a coating provided on at least one of said abrasion partners, wherein said coating contains approximately 30% to approximately 50% diamond particles that are embedded in a matrix, and wherein said matrix contains nickel.

2. An implement according to claim 1, wherein only said brake band is provided with a coating that includes diamond particles.

3. An implement according to claim 1, wherein said diamond particles have an average granular size of up to approximately 15 μm.

4. An implement according to claim 3, wherein said diamond particles have an average granular size of approximately 5 μm to approximately 10 μm.

5. An implement according to claim 1, wherein said matrix contains approximately 3% to approximately 10% phosphorous.

6. An implement according to claim 1, wherein said matrix is composed of nickel and phosphorous.

7. An implement according to claim 1, wherein said coating has a thickness (a) that is approximately 10 μm to approximately 80 μm.

8. An implement according to claim 7, wherein said thickness (a) of said coating is approximately 25 μm to approximately 50 μm.

9. An implement according claim 1, wherein said coating has an arithmetic average roughness value of ($R_a$) of approximately 3 μm to approximately 10 μm.

10. An implement according to claim 1, wherein said coating has an averaged roughness depth ($R_z$) of approximately 0.4 μm to approximately 1 μm.

11. A manually guided implement, comprising:
a tool;
a brake mechanism for the tool, wherein said brake mechanism includes a brake band that is looped about a brake drum, and wherein said brake band and said brake drum form abrasion partners that cooperate with one another during a braking process; and
a coating provided on at least one of said abrasion partners, wherein said coating includes diamond particles that are embedded in a matrix, further wherein said matrix contains nickel, and
wherein at a depth of cut of 3 μm, and below a 5%-line, said coating (21) has a material proportion (PMr) of approximately 35% to approximately 60%.

12. A manually guided implement, comprising:
a tool;
a brake mechanism for the tool, wherein said brake mechanism includes a brake band that is looped about a brake drum, and wherein said brake band and said brake drum form abrasion partners that cooperate with one another during a braking process; and
a coating provided on at least one of said abrasion partners, wherein said coating includes diamond particles that are embedded in a matrix, further wherein said matrix contains nickel, and
wherein at a depth of cut of 10 μm, and below a 5%-line, said coating has a material proportion (PMr) of approximately 60% to approximately 90%.

* * * * *